United States Patent
Nagatsuka et al.

(10) Patent No.: US 9,399,449 B2
(45) Date of Patent: Jul. 26, 2016

(54) VEHICLE TRAVEL CONTROL DEVICE

(71) Applicant: Hitachi Automotive Systems, Ltd., Hitachinaka-shi, Ibaraki (JP)

(72) Inventors: Keiichiro Nagatsuka, Hitachinaka (JP); Makoto Yamakado, Tokyo (JP); Mitsuhide Sasaki, Hitachinaka (JP); Mikio Ueyama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/406,810

(22) PCT Filed: May 29, 2013

(86) PCT No.: PCT/JP2013/064824
§ 371 (c)(1),
(2) Date: Dec. 10, 2014

(87) PCT Pub. No.: WO2013/187227
PCT Pub. Date: Dec. 19, 2013

(65) Prior Publication Data
US 2015/0166025 A1 Jun. 18, 2015

(30) Foreign Application Priority Data
Jun. 11, 2012 (JP) .................................. 2012-131715

(51) Int. Cl.
*G06F 19/00* (2011.01)
*B60T 8/172* (2006.01)
(Continued)

(52) U.S. Cl.
CPC . *B60T 8/172* (2013.01); *B60T 7/12* (2013.01); *B60T 7/18* (2013.01); *B60W 10/04* (2013.01);
(Continued)

(58) Field of Classification Search
CPC ....... B60T 8/172; B60T 7/12; B60T 2201/16; B60T 2230/03; B60T 2240/06; B60T 8/17551; B60T 8/17554; B60W 10/04; B60W 2520/105; B60W 10/20; B60W 2720/106; B60W 30/04; B60W 40/072; B60W 10/18; B60W 2520/125; B60W 2540/18; G09B 19/16
USPC ............ 701/70, 300, 301, 98, 93, 44; 434/66
See application file for complete search history.

(56) References Cited

U.S. PATENT DOCUMENTS

| 5,726,886 A | 3/1998 | Yamakado et al. |
| 2009/0030574 A1* | 1/2009 | Yamakado .......... B60W 30/045 701/44 |

(Continued)

FOREIGN PATENT DOCUMENTS

| JP | 2008-7107 A | 1/2008 |
| JP | 2008-285066 A | 11/2008 |

(Continued)

OTHER PUBLICATIONS

International Search Report (PCT/ISA/210) dated Sep. 10, 2013 with English-language translation (Four (4) pages).

*Primary Examiner* — Muhammad Shafi
(74) *Attorney, Agent, or Firm* — Crowell & Moring LLP

(57) ABSTRACT

A vehicle travel control device includes a control instruction value calculation unit, a driver acceleration intent quantification unit, and a control instruction value correction determination unit that determines whether correction of a control instruction value is required in response to a quantified driver's acceleration intent. The vehicle travel control device also includes a control instruction value correction unit that corrects the control instruction value in response to a correction determination result of the control instruction value correction determination unit. The driver acceleration intent quantification unit quantifies the driver's acceleration intent using an integral value of the longitudinal jerk occurring according to the brake operation of the driver.

13 Claims, 8 Drawing Sheets

(51) Int. Cl.

| | | |
|---|---|---|
| *B60T 7/12* | (2006.01) | |
| *B60W 10/04* | (2006.01) | |
| *B60W 10/188* | (2012.01) | |
| *B60W 30/188* | (2012.01) | |
| *B60W 40/09* | (2012.01) | |
| *F02D 29/02* | (2006.01) | |
| *B60T 7/18* | (2006.01) | |
| *F02D 41/04* | (2006.01) | |
| *F02D 41/10* | (2006.01) | |
| *F02D 41/12* | (2006.01) | |

(52) U.S. Cl.
 CPC ........... *B60W 10/188* (2013.01); *B60W 30/188* (2013.01); *B60W 40/09* (2013.01); *F02D 29/02* (2013.01); *F02D 41/045* (2013.01); *F02D 41/10* (2013.01); *F02D 41/12* (2013.01)

(56) References Cited

U.S. PATENT DOCUMENTS

| | | | |
|---|---|---|---|
| 2009/0055047 A1* | 2/2009 | Poilbout | B60G 17/0165 701/37 |
| 2009/0062984 A1* | 3/2009 | Poilbout | B60G 17/0161 701/37 |
| 2009/0143951 A1* | 6/2009 | Takahashi | B60W 30/02 701/70 |
| 2012/0323445 A1 | 12/2012 | Yamakado et al. | |
| 2013/0054128 A1* | 2/2013 | Moshchuk | G08G 1/167 701/301 |
| 2013/0131947 A1 | 5/2013 | Takahashi et al. | |

FOREIGN PATENT DOCUMENTS

| | | |
|---|---|---|
| JP | 2010-76584 A | 4/2010 |
| JP | 2011-157067 | 8/2011 |
| JP | 2012-30674 A | 2/2012 |

\* cited by examiner

VEHICLE TRAVEL CONTROL DEVICE

TECHNICAL FIELD

The present invention relates to a vehicle travel control device that controls the longitudinal acceleration of a vehicle.

BACKGROUND ART

The following travel control device is disclosed to the public as a vehicle travel control device that controls the longitudinal acceleration of a vehicle.

That is, one of the travel control devices is an adaptive cruise control (hereinafter, referred to as an ACC), and this travel control device is a device that controls the longitudinal acceleration of a host vehicle so as to maintain a host vehicle speed at a pre-set vehicle speed even without an accelerator operation or a brake operation of a driver, or to maintain the distance between the host vehicle and a vehicle travelling in front thereof at a predetermined space.

Another of the travel control devices is a pre-crash control device, and when a host vehicle cannot avoid a collision with a target approaching the host vehicle from the front, the side, the rear, or the like thereof, this control device reduces the impact of the collision by applying brakes, or reduces the impact of the collision on an occupant by appropriately tightening a seat belt.

In addition to these devices, there is the travel control device that safely and comfortably controls a vehicle like a skillful driver by controlling a longitudinal acceleration in response to a lateral jerk that occurs in the vehicle due to an operation of a driver, and PTL 1 discloses this type of control device. Typically, a travel control algorithm embedded in these travel control devices is referred to as a G-Vectoring control.

A technology is also disclosed in which a plurality of the above-mentioned travel control devices are integrated into one system by combining together a plurality of basic travel control algorithms.

Each of these travel control devices is a device that safely controls a vehicle, and at the same time, is a device that comfortably controls the vehicle to assist a driver in driving the vehicle. In particular, from the viewpoint of the device for comfortably controlling the vehicle, an important point is that the device is required to execute the control so as not to cause discomfort to the driver.

With regard to the travel control device that executes the control so as not to cause discomfort to the driver, PTL 2 discloses an acceleration and deceleration device that controls the acceleration and deceleration of a host vehicle, corrects the longitudinal acceleration of the host vehicle based on the lateral jerk of the host vehicle, and allows or prevents the correction to the longitudinal acceleration and deceleration of the host vehicle based on predetermined conditions.

CITATION LIST

Patent Literature

[PTL 1] JP-A-2008-285066
[PTL 2] JP-A-2010-76584

SUMMARY OF INVENTION

Technical Problem

According to the acceleration and deceleration control device disclosed in PTL 2, it is possible to adapt the operation of the host vehicle to a driver's acceleration or deceleration intent, and it is possible to reduce discomfort to the driver, which is induced by the correction control of acceleration and deceleration.

That is, this acceleration and deceleration control device takes into account mainly the "driver's acceleration or deceleration intent" associated with an accelerator operation of the driver, however, does not sufficiently take into account a relationship between the "driver's acceleration and deceleration intent" associated with a brake operation of the driver and a control instruction according to a travel control algorithm.

An object of the present invention is to provide a vehicle travel control device that can control a vehicle so as to adapt to a driver's driving intent while feedforward correcting a control instruction based on a brake operation of the driver during a certain time period.

Solution to Problem

A vehicle travel control device according to the present invention to achieve the object includes a control instruction value calculation unit that calculates a control instruction value to control the longitudinal acceleration of a vehicle; a driver acceleration intent quantification unit that calculates a longitudinal jerk from the longitudinal acceleration according to a brake operation of a driver, and quantifies the driver's acceleration intent based on the longitudinal jerk; a control instruction value correction determination unit that determines whether a correction to the control instruction value is required in response to the quantified driver's acceleration intent; and a control instruction value correction unit that corrects the control instruction value in response to the correction determination result of the control instruction value correction determination unit.

Advantageous Effects of Invention

According to the vehicle travel control device of the present invention, the driver's acceleration intent is quantified based on the longitudinal jerk according to the brake operation of the driver, and the travelling of the vehicle is controlled by feedforward correcting the control instruction value as necessary in response to the quantified driver's acceleration intent, and thereby it is possible to control the vehicle to adapt to the driver's acceleration intent.

DESCRIPTION OF EMBODIMENTS

Hereinafter, embodiments of a vehicle travel control device according to the present invention will be described with reference to the accompanying drawings.

Embodiment 1 of Vehicle Travel Control Device

Hereinafter, the vehicle travel control device according to Embodiment 1 of the present invention will be described with reference to FIGS. 1 to 7.

Configuration of Travel Control Device

Figure 1:
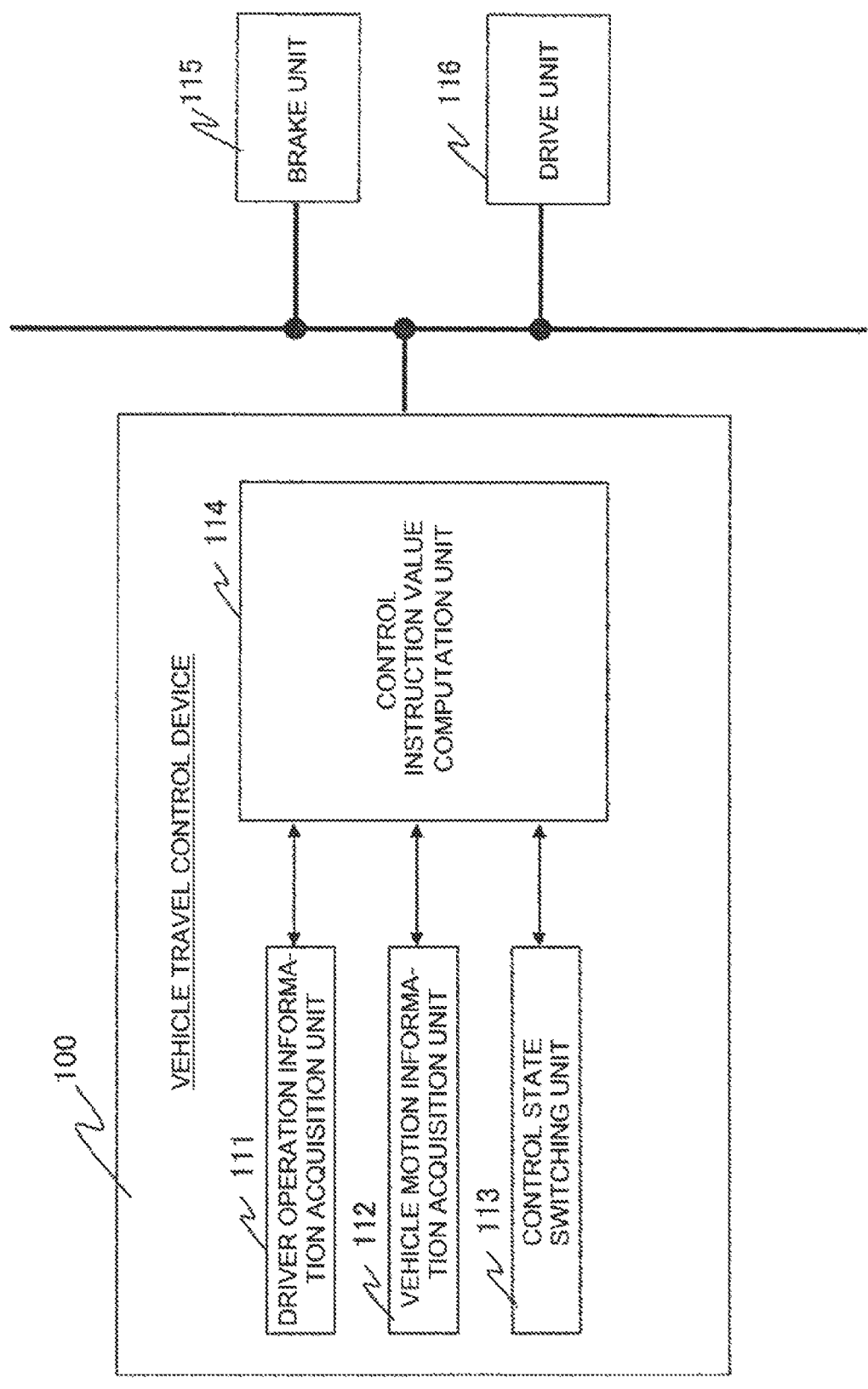
FIG. 1 is a block diagram of a vehicle travel control device according to Embodiment 1 of the present invention.

FIG. 1 is a block diagram of the vehicle travel control device according to the embodiment. In FIG. 1, a vehicle travel control device 100 includes a driver operation information acquisition unit 111; a vehicle motion information acquisition unit 112; a control status switching unit 113; and a control instruction value computation unit 114.

A brake unit 115 brakes a vehicle, and a drive unit 116 drives the vehicle in response to a control instruction value computed by the travel control device 100.

The driver operation information acquisition unit 111 collects driver operation information such as an accelerator operation amount, a brake operation amount, and a steering angle, and transmits the driver operation information to the control instruction value computation unit 114.

The vehicle motion information acquisition unit 112 collects vehicle behavior information such as a host vehicle speed, a yaw rate, a longitudinal acceleration, and a lateral acceleration, and transmits the vehicle behavior information to the control instruction value computation unit 114.

The driver operation information acquisition unit 111 and the vehicle motion information acquisition unit 112 can preferably collect information necessary for a travel control algorithm, and transmit the information to the control instruction value computation unit 114, and as necessary, it is also possible to add configurations such as a sensor.

The control status switching unit 113 serves to switch the process content of a control instruction value correction determination process which will be described later. Specifically, a driver can switch the process content via a switch-selectable button that has, for example, a normal mode and a teaching mode.

The control instruction value computation unit 114 is configured to have a read only memory (ROM) for storing the travel control algorithm; a central processing unit (CPU) for executing various computational processes; and a random access memory (RAM) for storing computational results. Hereinafter, the detailed internal configuration of the control instruction value computation unit 114 will be described with reference to FIG. 2.

The brake unit 115 serves to brake the vehicle in response to a control instruction value (brake instruction value) for the vehicle, which is computed by the control instruction value computation unit 114. For example, it is adequate for the brake unit 115 to have a mechanism that includes a pump for discharging a high-pressure brake fluid, electro-magnetic valves for adjusting the pressure of the brake fluid and supplying the brake fluid to an oil cylinder of each of the wheels, and the like.

The drive unit 116 serves to drive the vehicle in response to a control instruction value (drive instruction value) for the vehicle, which is computed by the control instruction value computation unit 114. Specifically, it is adequate for the drive unit 116 to have an engine system or an electric motor system which can change the drive force of the vehicle in response to the drive instruction value.

In the embodiment, the travel control device 100, the brake unit 115, and the drive unit 116 are configured as separate blocks, however, for example, it is possible to combine the vehicle travel control device 100 and the brake unit 115 into one system, combine the vehicle travel control device 100 and the drive unit 116 into one system, or combine all of the vehicle travel control device 100, the brake unit 115, and the drive unit 116 into one system.

In the embodiment, the control instruction value computation unit 114, the driver operation information acquisition unit 111, the vehicle motion information acquisition unit 112, and the control status switching unit 113 read and transmit information using a serial communication or an analog digital converter (ADC) that converts a physical quantity into a voltage signal. The control instruction value computation unit 114, the brake unit 115, and the drive unit 116 use a controller area network (CAN) for the transmission of information, which is typically used as a vehicle-mounted network.

Internal Configuration of Control Instruction Value Computation Unit

Figure 2:
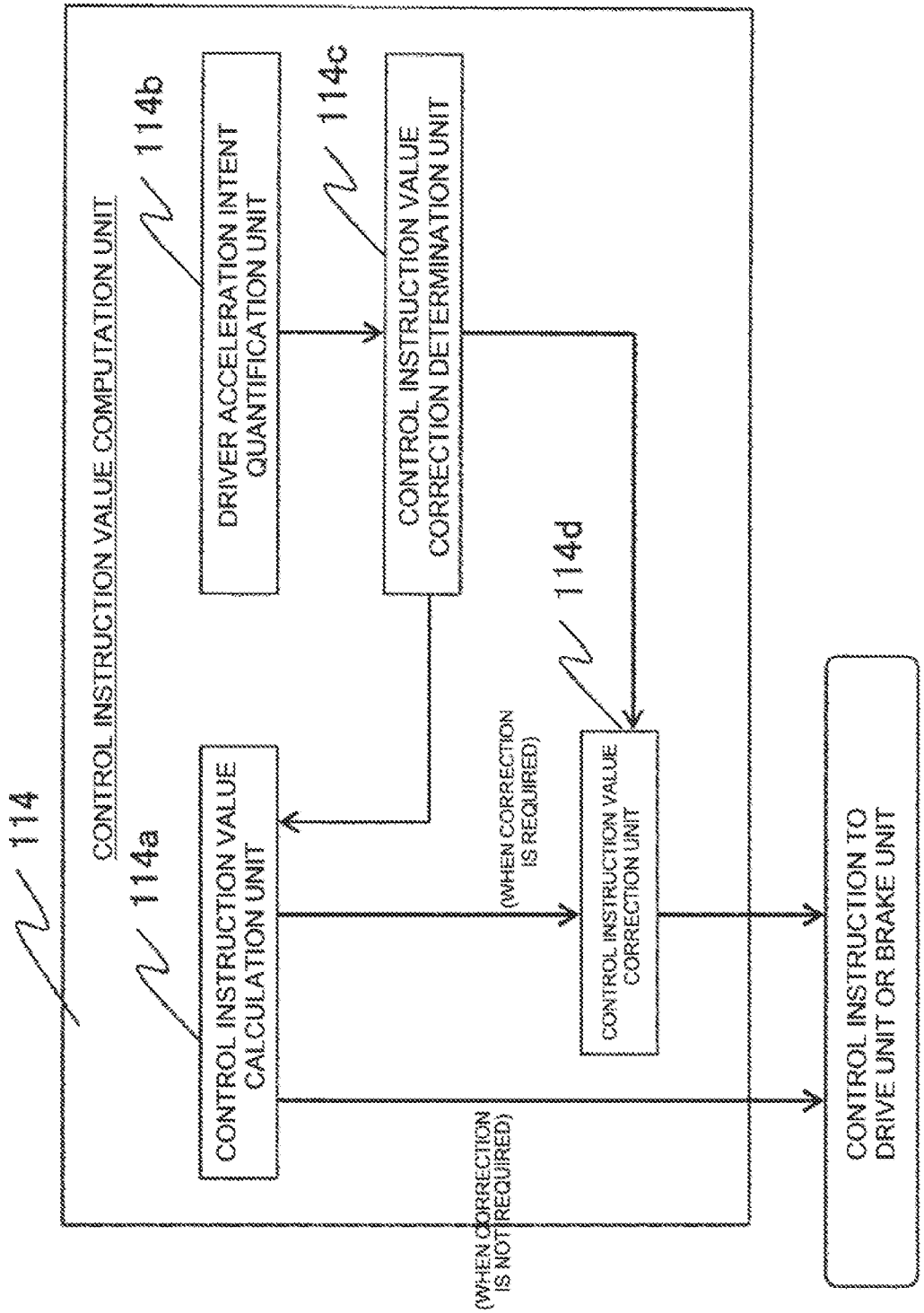
FIG. 2 is a block diagram of the inside of a control instruction value computation unit.

Subsequently, the internal configuration of the control instruction value computation unit 114 will be described. FIG. 2 is a block diagram of the inside of the control instruction value computation unit. In FIG. 2, the CPU, the RAM, and the like are not illustrated. In FIG. 2, the control instruction value computation unit 114 includes a control instruction value calculation unit 114a that calculates a GVC control instruction value to be transmitted to the drive unit or the brake unit, and a driver acceleration intent quantification unit 114b that calculates a longitudinal jerk from a longitudinal acceleration according to a brake operation of the driver, and quantifies (calculates) a driver's acceleration intent based on the calculated longitudinal jerk. The control instruction value computation unit 114 further has a control instruction value correction determination unit 114c that determines whether the GVC control instruction value calculated by the control instruction value calculation unit 114a is required to be corrected (the necessity of a correction) in response to the driver's acceleration intent quantified by the driver acceleration intent quantification unit 114b, and a control instruction value correction unit 114d that corrects the GVC control instruction value when a correction is required, and calculates the corrected control instruction value. When it is determined that it is not necessary to correct the GVC control instruction value calculated by the control instruction value calculation unit 114a, based on the determination result of the control instruction value correction determination unit 114c, the GVC control instruction value is transmitted to the brake unit or the drive unit as a control instruction value.

Process Flow

Figure 3:
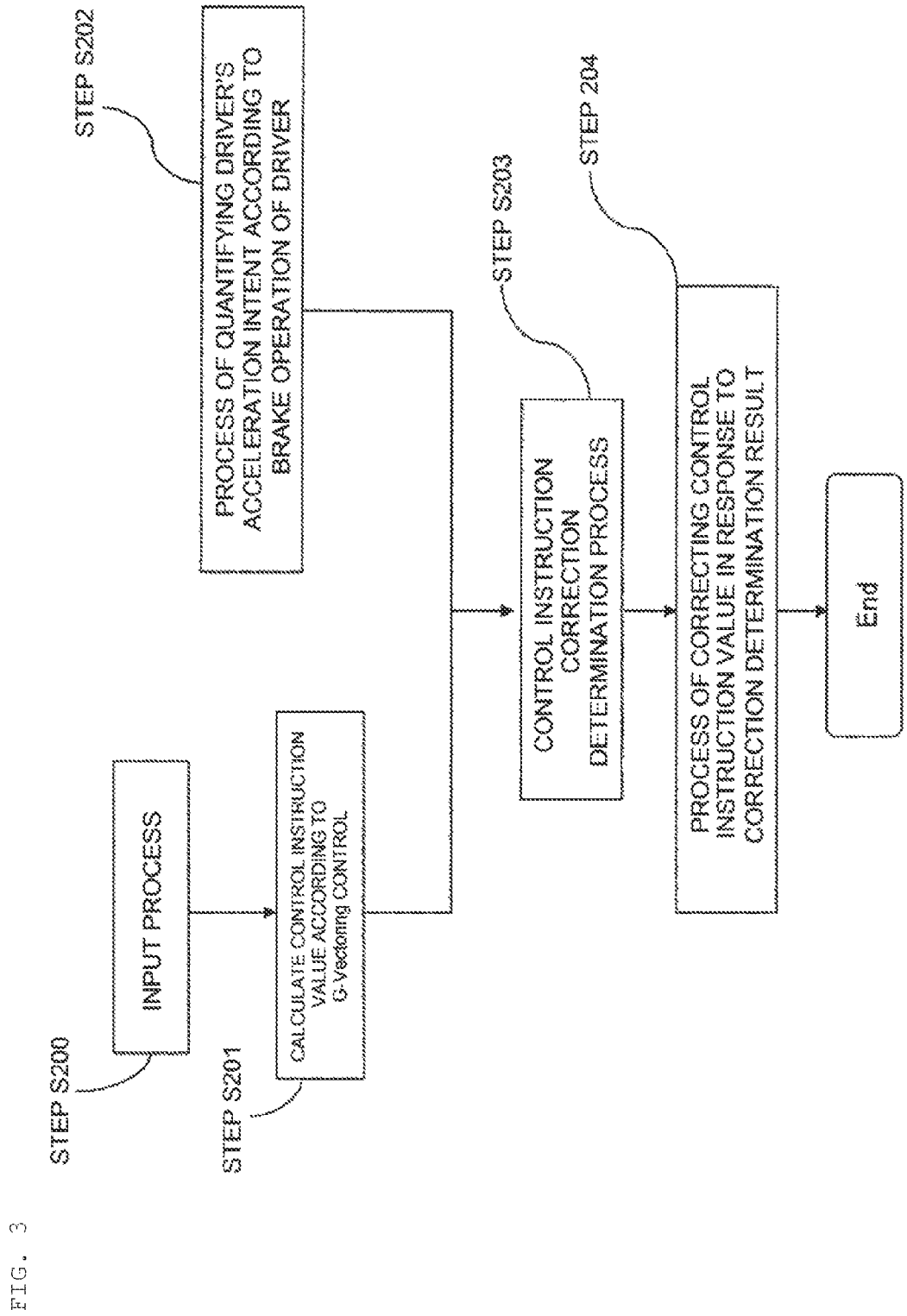
FIG. 3 is a flowchart illustrating a process executed by the control instruction value computation unit.

Subsequently, a specific process of the control instruction value computation unit 114 of the vehicle travel control device 100 according to the embodiment will be described with reference to FIG. 3. FIG. 3 is a flowchart illustrating a routine executed by the control instruction value computation unit 114, and the routine illustrated is repeated at predetermined time intervals.

In the following description, the travel control algorithm embedded in the control instruction value computation unit 114 is the G-Vectoring control.

When the routine starts, first, the control instruction value computation unit 114 executes an input process at step S200, receives information measured by the driver operation information acquisition unit 111, the vehicle motion information acquisition unit 112, and the control status switching unit 113, via the CAN, and then converts the received information into data of a format used at step S200. Specifically, the control instruction value computation unit 114 calculates a new physical quantity for the input signal by the execution of a physical unit conversion process, a time-based differentiation process for the input signal, and computation according to a known physical expression.

Subsequently, a G-Vectoring control process is executed at step S201, and the GVC control instruction value (Gx_GVC) is calculated according to Expression 1.

$$G_{x\_GVC} = -\text{sgn}(Gy \cdot \dot{G}y)\frac{C_{xy}}{1+Ts}|\dot{G}y| \quad [\text{Expression 1}]$$

Here, Gx_GVC: GVC control instruction value [G], Gy: vehicle lateral acceleration [G], G'y: vehicle lateral jerk [G/s], Cxv: control gain, T: transient delay time constant, s: Laplace operator In the embodiment, the information input from the vehicle motion information acquisition unit 112 is used as a vehicle lateral acceleration and a vehicle lateral jerk used in Expression 1, however, the information input may be estimated from the steering angle and the host vehicle speed according to a known vehicle model.

The gravitational acceleration [G] is expressed as the unit of the control instruction value calculated at this step, and a positive value indicates an acceleration instruction value, and a negative value indicates a deceleration instruction value.

Subsequently, a driver acceleration intent quantification process according to a brake operation of the driver is executed at step S202, and driver's acceleration intent (Gx_DrvWill) is quantified (calculated) according to Expressions 2 to 4.

$$Gx\_Drv = P_M * mMPa\_to\_G \quad [\text{Expression 2}]$$

Here, Gx_Drv: lateral acceleration according to brake operation of driver [G], PM: fluid pressure of master cylinder [MPa], mPa_to_G: acceleration scale factor [G/MPa]

$$Jx\_Drv = \frac{d}{dt}(Gx\_Drv) \quad [\text{Expression 3}]$$

Here, Jx_Drv: longitudinal jerk according to brake operation of driver [G/s], Gx_Drv: longitudinal acceleration according to brake operation of driver [G]

$$Gx\_DrvWill = \sum_{\tau_0}^{t=0}(Jx\_Drv) \quad [\text{Expression 4}]$$

Here, Gx_DrvWill: driver's acceleration intent [G], Jx_Drv: longitudinal jerk according to brake operation of driver [G/s], τ0: integral time. Care should be taken in that the integral time indicates a past time. It is reasonable to set the integral time from several hundred milliseconds to a few seconds.

Typically, the longitudinal acceleration is a value measured by an acceleration sensor or the like, or a value calculated by time-differentiating a global, positioning system (GPS) measurement value, and in many cases, a longitudinal acceleration exerted on the vehicle is used as a longitudinal acceleration. However, in the embodiment, one of the features is that the fluid pressure of the master cylinder and the acceleration scale factor (mMPa_to_G) calculated by experiments performed in advance are used to estimate the longitudinal acceleration occurring according to a brake operation of the driver.

Subsequently, the control instruction value correction determination process is executed at step S203, and a correction determination status (T_status) is calculated. The correction determination status is determined through the processes illustrated in Table 1, in response to the driver's acceleration intent (Gx_DrvWill) quantified at the above-mentioned step and the GVC control instruction value (Gx_GVC).

According to the process content defined in Table 1, it is determined whether input data satisfies the respective listed conditions as per the sequence listed in a priority sequence column, and when the conditions are satisfied, the listed processes for output data are executed. When the condition is not satisfied, the determination of the conditions subsequent thereto is not executed.

TABLE 1

Logic Table of Control Instruction Correction Determination Process

| | Input Data | | Output Data |
|---|---|---|---|
| Priority sequence | Driver's acceleration intent (Gx_DrvWill) | GVC control instruction value (Gx_GVC) | Correction Determination Status (T_status) |
| 1 | Driver acceleration intent section ≥ Gx_Th_acc1 | Deceleration instruction ≤ 0 | Correction (T_Corr) |
| 2 | Driver deceleration intent section ≤ Gx_Th_dec1 | Acceleration instruction > 0 | Correction (T_Corr) |
| 3 | Other than the conditions above | | Non-correction (T_NotCorr) |

Here, T_status: correction determination status, Gx_DrwWill: driver's acceleration intent [G], Gx_GVC: GVC control instruction value [G], Gx_Th_acc1: first threshold value 1 for determining that driver has acceleration intent. [G], Gx_Th_dec1: first threshold value for determining that driver has deceleration intent [G], T_NotCorr: value indicative of non-correction, T_Corr: value indicative of correction Here, the control status switching unit 113 can also switch the correction status determination condition in response to a mode selected by the driver, which is not illustrated in Table 1. Specifically, when the normal mode is selected, the correction determination status is determined through the processes in Table 1, and when the teaching mode is selected, typically, a process is performed to set the correction determination status to the value indicative of non-correction (T_NotCorr).

Since the correction status determination condition on is optionally switched, it is possible to reduce the discomfort of the driver by virtue of the effects of the present invention when the normal mode is selected. Accordingly, although it is not possible to reduce the discomfort of the driver when the teaching mode is selected the driver can feel the intrinsic control amount and timing of the travel control algorithm.

Subsequently, the control instruction value correction process is executed at step S204, and the processes illustrated in Table 2 are performed in response to the correction determination status (T_status) calculated at step S203. The process content defined in Table 2 is as follows.

TABLE 2

Logic Table of Control Instruction Value Correction Process

| Priority sequence | Input Data<br>Correction determination status (T_status) | Output Data<br>Corrected control instruction value (Gx_Corr) |
|---|---|---|
| 1 | Non-correction (T_NoCorr) | Non-correction Gx_GVC |
| 2 | Other than the condition above | Correction Gx_GVC* |

Figure 4:
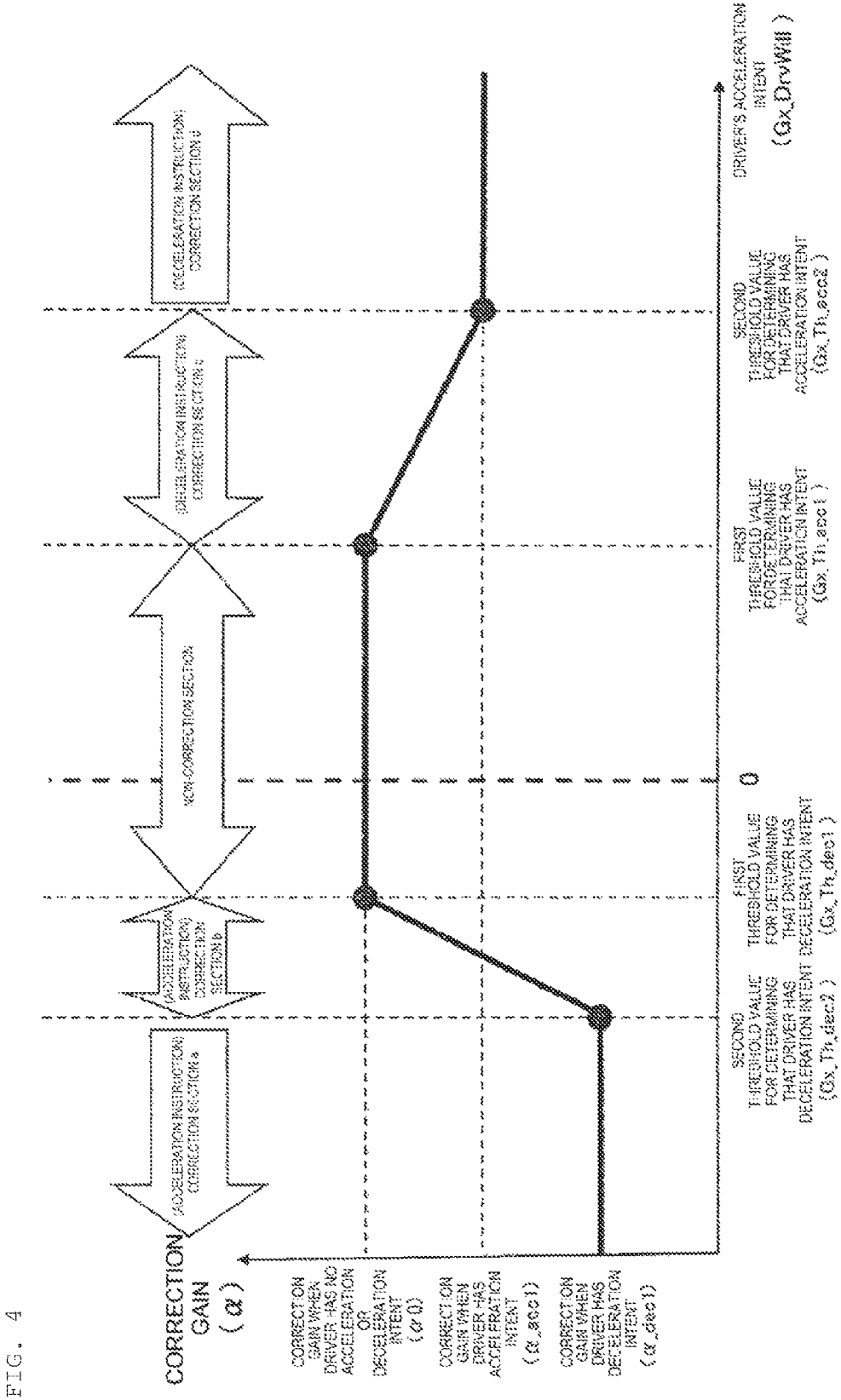
FIG. 4 is a graph illustrating a method of calculating a correction gain used in a control instruction value correction process executed by the control instruction value computation unit.

Here, Gx_Corr: corrected control instruction value [G], T_status: correction determination status, Gx_GVC: GVC control instruction value [G], α: correction gain Subsequently, a method of calculating the correction gain (α) used in this process will be described with reference to FIG. 4. In FIG. 4, the horizontal axis indicates the driver's acceleration intent, and the vertical axis indicates the correction gain. Hereinafter, the relationship between the driver's acceleration intent and the correction gain will be described based on when the driver's acceleration intent is acceleration (Gx_DrvWill>0).

Non-Correction Section

In this section, since the driver's acceleration intent is a value around "0", it is determined that the driver has no acceleration intent or deceleration intent, and a correction gain (α0) is selected. Typically, at this time, even when the control instruction value calculated by the travel control algorithm is applied in controlling the vehicle as it is, the driver does not feel discomfort, and thus the correction gain (α0) is set to "1".

(Deceleration Instruction) Correction Section c

In this section, since the driver's acceleration intent exceeds the first threshold value (Gx_Th_acc1) for determining that the driver has acceleration intent, it is determined that she driver intends to accelerate the vehicle, and the correction gain less than "1" is selected to decrease the control instruction value.

Specifically, since the driver's acceleration intent is present between the first threshold value (Gx_Th_acc1) and a second threshold value (Gx_Th_acc2) which determines that the driver has acceleration intent, the correction gain is set to a linearly corrected value between the correction gain (α0) and a correction gain for an acceleration intent (α_acc1) which is pre-adjusted through experiments or the like so as not to spoil driver's feeling. Accordingly, when the driver has acceleration intent, it is possible to decrease the (deceleration) control instruction value of the travel control algorithm, and it is possible to prevent the control instruction value from being the opposite of the driver's acceleration intent.

(Deceleration Instruction) Correction Section d

In this section, since the driver's acceleration intent increases further, and exceeds the second threshold value (Gx_Th_acc2) that is a value indicative of clear driver's acceleration intent and determines that the driver has acceleration intent, the correction gain for acceleration intent (α_acc1) is selected. When the correction gain for acceleration intent (α_acc1) is set to "0", the (deceleration) control instruction value is consequentially prevented.

In the description above, the driver's acceleration intent is acceleration (Gx_DrvWill>0), however, the same applies to when the driver's acceleration intent is deceleration (Gx_DrvWill≤0). At this time, care should be taken in that the (acceleration) control instruction value of the travel control algorithm decreases further as the acceleration intent increases.

Example of Specific Travel Scene

Figure 5:
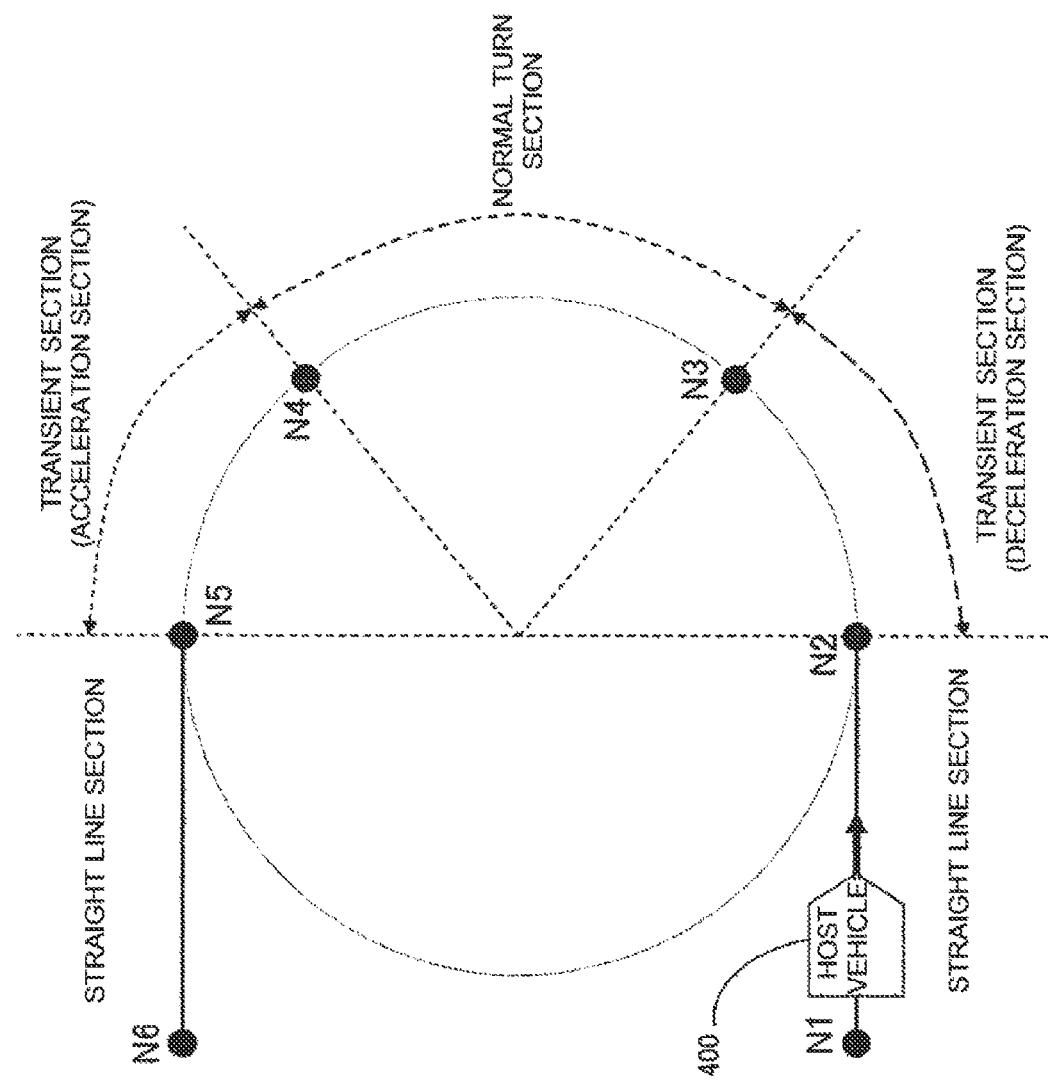
FIG. 5 is a schematic diagram illustrating a travel path while a vehicle enters and passes through a curve.

FIG. 5 is a schematic diagram illustrating a travel path while the host vehicle equipped with the vehicle travel control device according to the embodiment enters and passes through a curve. In FIG. 5, the travel path includes a straight line section (N1 to N2); a fluently curved transient section (N2 to N3); a normal turn section (N3 to N4); a fluently curved transient section (N4 to N5); and a straight line section (N5 to N6).

The following description will be given of a scenario in which the driver applies the brakes, and reduces the vehicle speed once before the host vehicle enters the transient section (N2 to N3), and the driver lightly applies the brakes, and reduces the vehicle speed before the host vehicle enters the transient section (N4 to 15).

Figure 6:
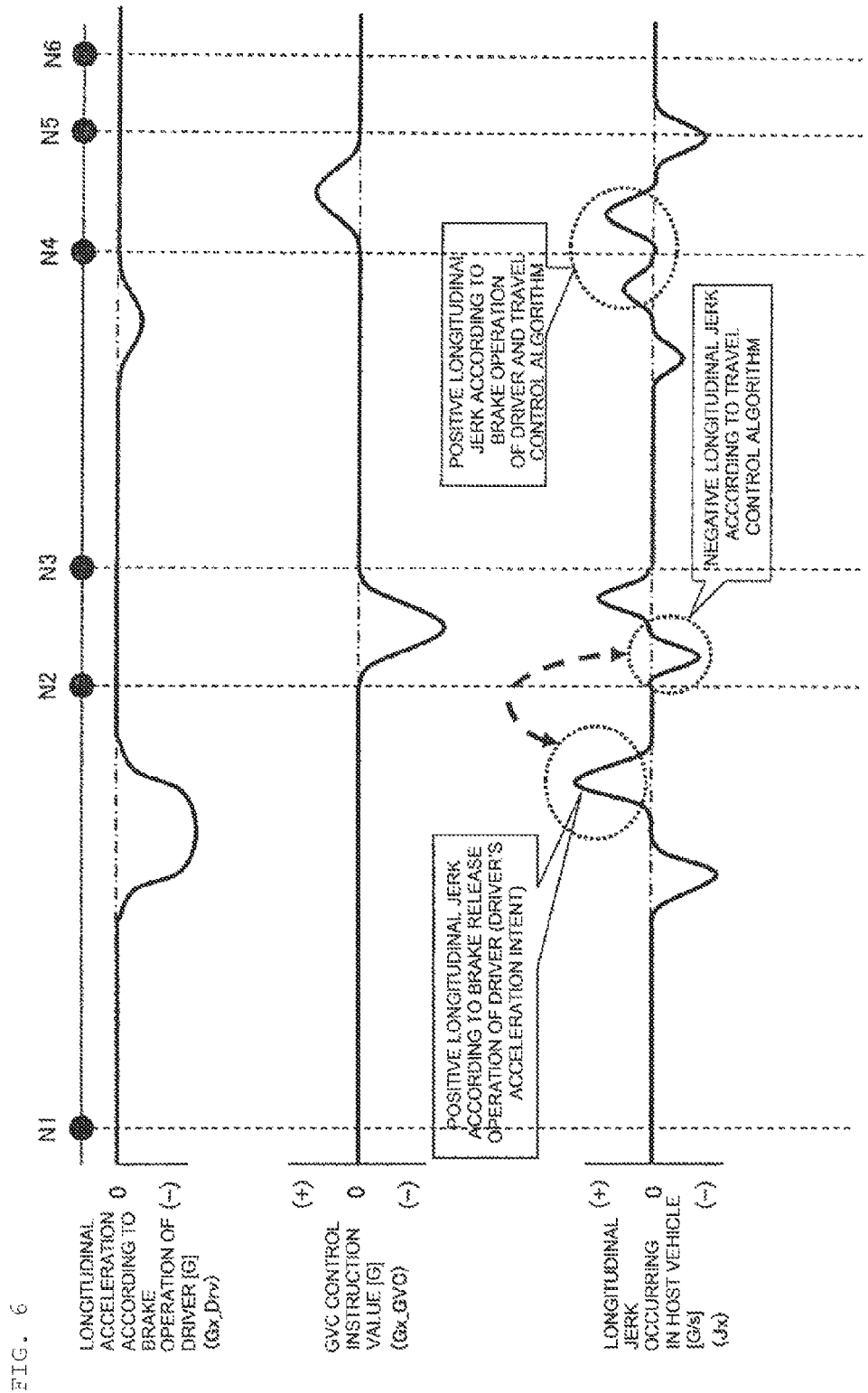
FIG. 6 shows graphs illustrating an example of a control instruction in the related art.

First, the operation of the host vehicle equipped with the vehicle travel control device of the related art when travelling according to the above-mentioned scenario will be described with reference to FIG. 6. FIG. 6 illustrates the respective time-series waveforms of the longitudinal acceleration according to a brake operation of the driver, the GVC control instruction value, and the longitudinal jerk occurring in the host vehicle.

Straight Line Section (N1 to N2)

In this section, the driver maintains the steering angle constant in order for the host vehicle to travel straight. For this reason, since the lateral acceleration exerted on the host vehicle becomes a constant value around zero, the GVC control instruction value becomes zero. According to the above-mentioned scenario, the driver applies the brakes and reduces the host vehicle speed before the host vehicle enters the transient section (N2 to N3) (that is, before the host vehicle enters the curve). First, a negative longitudinal jerk occurs and then a positive longitudinal jerk occurs in the host vehicle due to the operation of the driver.

Transient Section (N2 to N3)

Subsequently, when the host vehicle enters the transient section (N2 to N3), the driver starts turning a steering wheel gradually, and starts further turning the steering wheel. The lateral acceleration exerted on the host vehicle also increases gradually in response to the operation of the driver. Since the lateral jerk increases in this manner, a deceleration control instruction value is calculated as the GVC control instruction value. The negative longitudinal jerk and the positive longitudinal jerk occur in the host vehicle due to the control instruction of the travel control algorithm.

At this time, during the straight line section thru the transient section, even though the driver finishes applying the brakes in the straight line section, the host vehicle speed decreases again due to the control instruction of the travel control algorithm when the host vehicle enters the transient section, and thereby results in a possibility of causing annoying deceleration which is not intended by the driver. However, in the related art, there is no method of appropriately reading the driver's acceleration intent associated with the brake operation. In addition, in a case where the control instruction is applied when a constant period elapses since the brake operation ends according to the travel scenario, it is difficult to appropriately correct the control instruction so as to adapt to the driver's intent because the operation of the driver has already ended at that point.

In addition, when the inversion of the sign of the longitudinal jerk occurs during a short time during which the vehicle passes through the straight line section and the transient section, the driver or a fellow passenger feels discomfort or displeasure.

Normal Turn Section (N3 to N4)

Subsequently, when the vehicle enters the normal section (N3 to N4), the driver stops further turning the steering wheel, and maintains a constant steering angle. At this time, since the lateral acceleration exerted on the host vehicle is constant, the GVC control instruction value becomes zero. According to the above-mentioned travel scenario, before the host vehicle enters the transient section (N4 so N5) (that is, when the host vehicle passes through the curve), the driver lightly applies the brakes, and reduces the host vehicle speed again. Similarly, after the negative longitudinal jerk occurs in the host vehicle in the beginning, the positive longitudinal jerk occurs due to the operation of the driver.

Transient Section (N4 to N5)

Subsequently, when the host vehicle enters the transient section (N4 to N5), the driver starts restoring the steering wheel to the original position. The lateral acceleration exerted on the host vehicle decreases gradually in response to the operation of the driver. Since the lateral jerk decreases in this manner, an acceleration control instruction value is calculated as the GVC control instruction value. A positive longitudinal jerk and a negative longitudinal jerk occur in the host vehicle according to the control instruction of the travel control algorithm.

Unlike the transient section (N2 to N3), it is not considered that the acceleration is the opposite of the driver's intent because this case is the acceleration after the driver finishes applying the brakes. The sign of the longitudinal jerk according to a drive operation of the driver is not the opposite of that of the longitudinal jerk according so the control algorithm, and thereby does not cause discomfort to the driver or the fellow passenger.

Straight. Line Section (N5 to N6)

Thereafter, when the host vehicle enters the straight line section (N5 to N6) the driver stops the steering operation, and maintains a constant steering angle in order for the vehicle to travel straight. Since the lateral acceleration exerted on the host vehicle is constant, the GVC control instruction value returns bank to zero again. At this time, the longitudinal jerk also becomes a constant value around zero.

Figure 7:
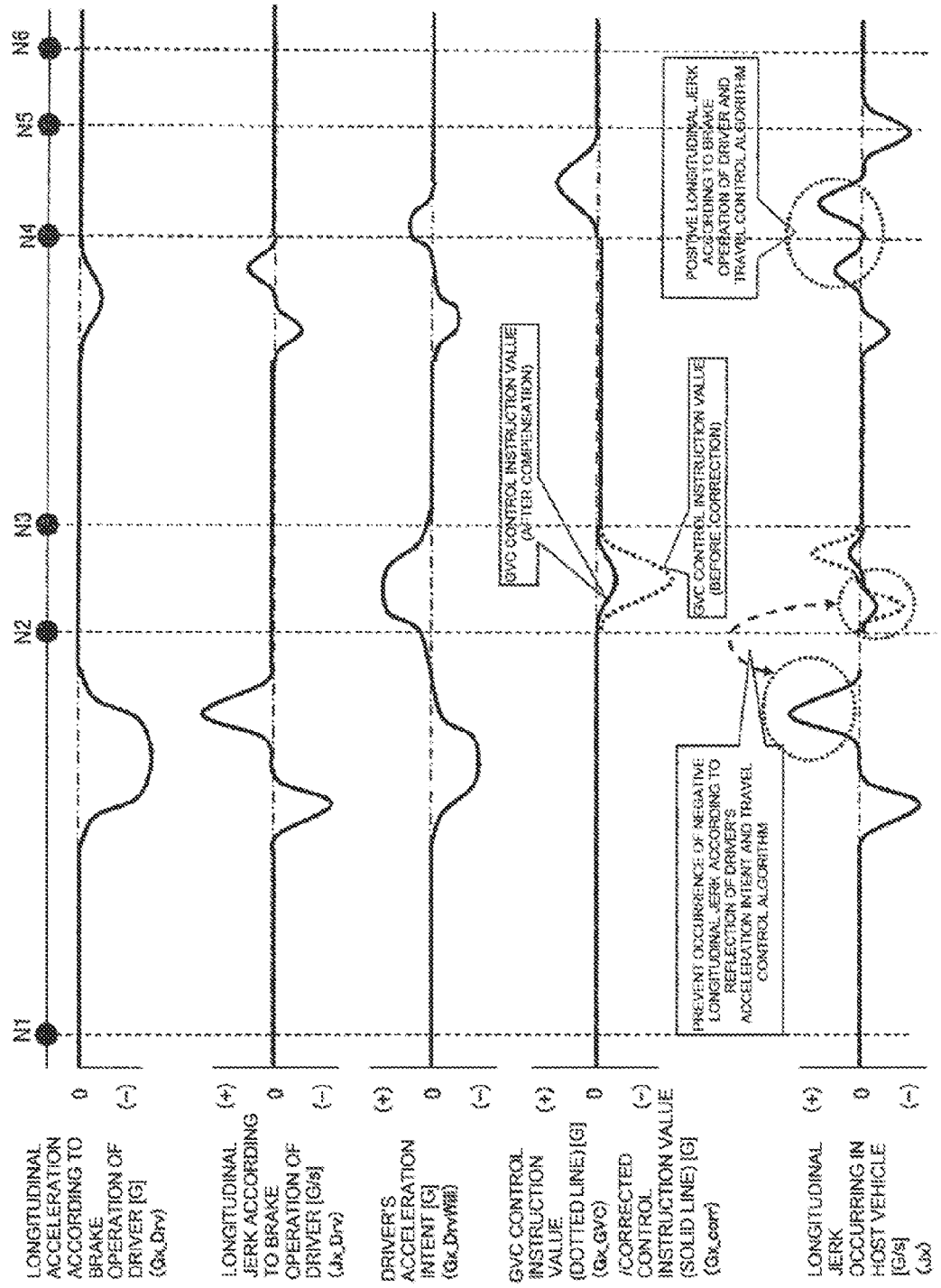
FIG. 7 shows graphs illustrating an example of the control instruction according to Embodiment 1 of the present invention.

Subsequently, the operation of the host vehicle equipped with the vehicle travel control device according to the embodiment when travelling according to the above-mentioned scenario will be described with reference to FIG. 7. FIG. 7 illustrates the respective time-series waveforms of the longitudinal acceleration according to a brake operation of the driver, the longitudinal jerk according to the brake operation of the driver, the driver's acceleration intent, the GVC control instruction value (dotted line), the corrected control instruction value (solid line), and the longitudinal jerk occurring in the host vehicle.

Straight Line Section (N1 to N2)

As described above, in this section, the GVC control instruction value becomes zero. According to the above-mentioned scenario, the driver applies the brakes and reduces the host vehicle speed before the host vehicle enters the transient section (N2 to N3) (that is, before the host vehicle enters the curve).

Here, if the longitudinal, acceleration according to the brake operation of the driver, and the longitudinal jerk according to the brake operation of the driver are attentively examined, when the driver depresses the brakes gradually toward the floor of the host vehicle, the longitudinal jerk decreases in a negative direction, and returns back to a value around zero again after reaching the peak in the negative direction once. At this time, the driver has the strong intent of reducing the host vehicle speed.

Subsequently, the driver provides a section in which the brakes are maintained at almost a constant depression amount, and provides a section in which it is not determined whether the brakes are depressed toward the floor of the host vehicle or the brakes are released, in other words, the determination is delayed. At this time, the longitudinal jerk becomes a value around zero, and it is read that the driver has no acceleration or deceleration intent, or the determination is delayed.

Subsequently, when the driver releases the brakes gradually, the longitudinal jerk increases in a positive direction, and returns back to a value around zero again after reaching the peak in the positive direction once. At this time, it is possible to read the driver's intent of accelerating (or being ready to accelerate) the host vehicle. At this time, when the host vehicle speed does not decrease sufficiently in the curved path unlike the travel scenario, the driver may apply the brakes coward the floor thereof again. In this case, since the longitudinal jerk also decreases in the negative direction as described above, it is a matter of course that it is possible to read the driver's deceleration intent.

As described above, it is possible to read the driver's acceleration or deceleration intent while the driver applies the brakes to reduce the host vehicle speed. In Embodiment 1 of the present invention, it is possible to reduce a deviation between the driver's acceleration and deceleration intent and the control instruction value, and reduce the discomfort of the driver or the fellow passenger by quantifying the driver's acceleration intent according to Expressions 2 to 4. In particular, it is possible to consider the driver's acceleration intent during a constant period, which is quantified from the brake operation using integral calculus according so Expression 4, and as described above, even when there is a constant time gap between the brake operation of the driver and the application of the control instruction, it is possible to feedforward correct the control instruction as necessary.

Transient Section (N2 to N3)

In this section, since the driver's acceleration intent is a positive value, that is, the driver has the intent of accelerating (or being ready to accelerate) the host vehicle due to the influence of the longitudinal acceleration according to the brake operation of the driver in the straight line section (N1 to N2), the GVC control instruction value (dotted line) of she deceleration instruction becomes the corrected control instruction (solid line) by virtue of a weak gain.

It is possible to reflect the driver's acceleration or deceleration intent in which it is not necessary to strongly decelerate the host vehicle again during a constant period after the driver applies the brakes in the straight line section. In addition, it is possible to change the longitudinal jerk occurring in the host vehicle according to the solid line, it is possible to prevent (remove) the inversion of the sign of the longitudinal jerk during a short time during which the host vehicle passes through the straight line section and the transient section, and it is possible to reduce the discomfort of the driver or the fellow passenger.

Normal Turn Section (N3 to N4)

Subsequently, the brake operation of the driver in this section is also quantified as the driver's acceleration intent as illustrated in FIG. 7.

Transient Section (N4 to N5)

In this section, as described above, the driver' acceleration intent is in effect due to the influence of the longitudinal acceleration according to the brake operation of the driver in the normal turn section (N3 to N4), however, since the longitudinal acceleration according to the brake operation of the driver is a positive value, that is, the driver has the intent of accelerating (or being ready to accelerate) the host vehicle, the GVC control instruction value (dotted line) of the acceleration instruction does not decrease, and the GVC control instruction value is output as the corrected control instruction (solid line) (since the solid line and the dotted line have the same values, it is possible to confirm only the solid line in FIG. 7).

As such, according to the present invention, it is possible to demonstrate the intrinsic effects of the travel control algorithm without executing the correction process when the driver does not feel discomfort.

Straight Line Section (N5 to N6)

Thereafter, the operation of the host vehicle when entering the straight line section (N5 to N6) is the same as that in the related art.

In the description above, the travel control algorithm embedded in the control instruction computation unit is the G-vectoring control, however, it is possible to obtain the same effects even when a travel control algorithm having other longitudinal accelerations as the control instructions is added, or is replaced with that in the embodiment.

Embodiment 2 of Vehicle Travel Control Device

The vehicle travel control device according to Embodiment 2 of the present invention will be described with reference to FIG. 8.

Since the embodiment has many of the same or similar portions to those in Embodiment 1, only the driver acceleration intent quantification process at step S202 according to a brake operation of the driver, which is a main difference, will be described below.

In Embodiment 1, the driver's acceleration intent is quantified by integrating the longitudinal jerk (Jx_Drv) associated with the brake operation of the driver according to Expression 4. In contrast, in the embodiment, according to Expressions 5 and 6, it is possible to much more clearly quantify the driver's intent by separately quantifying (integrating) the driver's acceleration intent and the driver's deceleration intent in response to whether the longitudinal jerk according to the brake operation of the driver is a positive value or a negative value.

$$Gx\_DrvAccWill = \sum_{\tau_a}^{t=0} (Jx\_Drv)(if\ (Jx\_Drv \geq 0)) \quad \text{[Expression 5]}$$

$$Gx\_DrvDecWill = \sum_{\tau_d}^{t=0} (Jx\_Drv)(if\ (Jx\_Drv < 0)) \quad \text{[Expression 6]}$$

Here, Gx_DrvAccWill: driver's acceleration intent [G], Gx_DrvDecWill: driver's deceleration intent [G], Jx_Drv: longitudinal jerk according to brake operation of driver [G/s], τa: integral time of acceleration intent [s], and τd: integral time of deceleration intent [s]. Care should be taken in that each of the integral times indicates a past time. It is reasonable to set the integral time from several hundred milliseconds to a few seconds.

Figure 8:
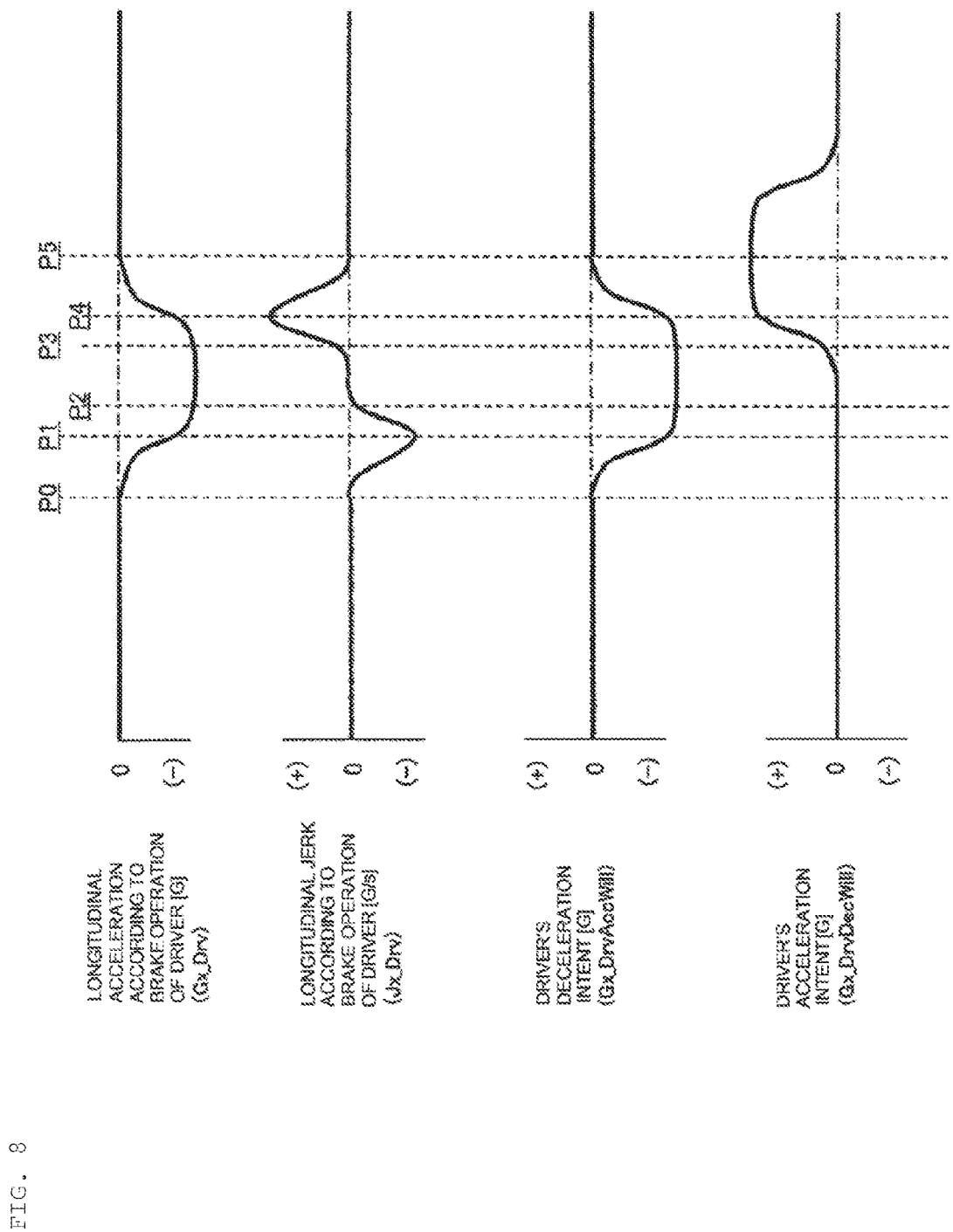
FIG. 8 shows graphs illustrating an exemplary method of calculating a driver's acceleration intent according to Embodiment 2 of the present invention.

FIG. 8 shows graphs illustrating an exemplary method of calculating the driver's acceleration intent and the driver's deceleration intent in the embodiment. FIG. 8 illustrates the respective time-series waveforms of the longitudinal acceleration according to the brake operation of the driver, the longitudinal jerk according to the brake operation of the driver, the driver's deceleration intent, and the driver's acceleration intent.

First, in the section of P0 to P2, since the driver depresses the brakes gradually, the longitudinal jerk according to the brake operation of the driver decreases in the negative direction, and returns back to a value around zero at P2 after reaching the peak at P1 in the negative direction. At this time, the driver's deceleration intent increases gradually in the negative direction, and becomes the minimum value at P2. At this time, the driver's acceleration intent remains zero. Accordingly, at this time, the driver's intent of reducing the host vehicle speed becomes the maximum value.

Subsequently, in the section of P2 to P3, since the driver maintains the brakes at almost a constant depression amount, the longitudinal jerk according to the brake operation of the driver also becomes constant around zero. For this reason, the driver's acceleration intent and the driver's deceleration intent do not change. Accordingly, it is possible to determine that the driver has strong deceleration intent in this section.

Subsequently, in the section of P3 to P5, since the driver releases the brakes gradually, the longitudinal jerk according to the brake operation of the driver increases in the positive direction, and returns back to a value around zero at P5 again after reaching the peak at P4 in the positive direction. At this time, the driver's deceleration intent returns back to zero gradually in response to the integral time (τd) of the deceleration intent, while having an influence on the past section. The driver's acceleration intent increases gradually in the positive direction, and becomes the maximum value at P5. Accordingly, in this section, while the driver's deceleration intent decreases gradually, the driver's acceleration intent increases gradually. For this reason, a driver's intent taking priority over the other driver's intent is selected in response to whether the control instruction according to the travel control algorithm is the acceleration instruction or the deceleration instruction, and then weak gain calculation and a correction process are executed similar to in Embodiment 1.

Subsequently, in the section after P5, since the driver does not apply the brakes, the driver's acceleration intent returns back to zero gradually in response to the integral time (τa) of the acceleration intent while having an influence on the past section. At this time, the driver's deceleration intent has already become zero.

As described above, it is possible to much more clearly quantify the driver's intent by separately quantifying (integrating) the driver's acceleration intent and the driver's deceleration intent in response to whether the longitudinal jerk according to the brake operation of the driver is a positive value or a negative value.

As such, the embodiments of the present invention are described in detail with respect to the drawings, however, specific configurations are not limited to those in the embodiments, and even when changes are made to the design, the present invention includes the changes insofar as the changes do not depart from the spirit of the present invention. For example, the embodiments are described in detail for easy understanding of the present invention, however, the present invention is not necessarily limited to the case where the present invention includes the entirety of the above-mentioned configurations. It is possible to replace a part of the configuration in one embodiment with the configuration of the other embodiment, and it is also possible to add the configuration of the other embodiment to the configuration of one embodiment. It is possible to add, remove, or replace the other configuration with a part of the configuration of each of the embodiments.

Specifically, in the description, the G-Vectoring control is used as the travel control algorithm, however, alternatively, the travel control algorithm may be the adaptive cruise control (ACC), the pre-crash control, or a travel control algorithm obtained by combining together two or more controls.

For example, a part of the entirety of the functions, the process units, and the like of each of the above-mentioned configurations may be realized in a form of hardware by designing the functions, the process units, and the like into an integrated circuit. A processor interprets a program for realizing each of the functions, and executing the program, and thereby the functions and the like of each of the above-mentioned configurations may be realized in a form of software. It is possible to out the information of the program, tables, files, and the like into a recording device such as a memory, a hard disc, or a solid state drive (SSD), or a recording medium such as an IC card, an SD card, or a DVD.

REFERENCE SIGNS LIST 100, 100A: travel control device
111: driver operation information acquisition unit
112: vehicle motion information acquisition unit.
113: control status switching unit
114, 114A: control instruction computation unit
115: brake unit
116: drive unit

The invention claimed is:

1. A vehicle travel control device comprising:
a control instruction value calculation unit that calculates a control instruction value to control the longitudinal acceleration of a vehicle;
a driver acceleration intent quantification unit that calculates a longitudinal jerk from the longitudinal acceleration according to a brake operation of a driver, and quantifies a driver's acceleration intent based on the longitudinal jerk;
a control instruction value correction determination unit that determines whether a correction to the control instruction value is required in response to the quantified driver's acceleration intent; and
a control instruction value correction unit that corrects the control instruction value in response to the correction determination result of the control instruction value correction determination unit, wherein
the driver acceleration intent quantification unit quantifies the driver's acceleration intent using an integral value of the longitudinal jerk occurring according to the brake operation of the driver.

2. The vehicle travel control device according to claim 1, wherein the longitudinal jerk is divided into the driver's acceleration intent and driver's deceleration intent, and is separately integrated in response to the sign of the longitudinal jerk occurring according to the brake operation of the driver, and calculates the integral value of each of the driver's acceleration intent and the driver's deceleration intent.

3. The vehicle travel control device according to claim 1, wherein when the sign of the quantified driver's acceleration intent is the opposite of that of the longitudinal jerk according to the control instruction value calculated by the control instruction value calculation unit, the control instruction value correction determination unit makes a determination of reducing the control instruction value.

4. The vehicle travel control device according to claim 1, wherein when the sign of the quantified driver's acceleration intent is the opposite of that of the longitudinal jerk according to the control instruction value calculated by the control instruction value calculation unit, the control instruction value correction determination unit makes a determination of preventing the application of the control instruction value.

5. The vehicle travel control device according to claim 1, wherein the control instruction value correction unit reduces the control instruction value in response to the magnitude of the quantified driver's acceleration intent.

6. The vehicle travel control device according to claim 1, wherein the control instruction value correction determination unit optionally switches a mode between a mode of determining whether a correction is required and a mode of not determining whether a correction is required.

7. The vehicle travel control device according to claim 1, wherein the control instruction value calculation unit calculates the control instruction value to control the longitudinal acceleration in response to a lateral jerk exerted on the vehicle.

8. A vehicle travel control device comprising:
a control instruction value calculation unit that controls a longitudinal acceleration of a vehicle;
a driver acceleration intent quantification unit that calculates a longitudinal jerk from the longitudinal acceleration according to a brake operation of a driver, and quantifies a driver's acceleration intent based on the longitudinal jerk;
a control instruction value correction determination unit that determines whether a correction to the control instruction value is required in response to the quantified driver's acceleration intent; and
a control instruction value correction unit that corrects the control instruction value in response to the correction determination result of the control instruction value correction determination unit, wherein
when the sign of the quantified driver's acceleration intent is the opposite of that of the longitudinal jerk according to the control instruction value calculated by the control instruction value calculation unit, the control instruction value correction determination unit makes a given determination that impacts the control instruction value.

9. The vehicle control device according to claim 8, wherein the given determination reduces the control instruction value.

10. The vehicle control device according to claim 8, wherein the given determination prevents the application of the control instruction value.

11. A vehicle travel control device comprising:
a control instruction value calculation unit that calculates a control instruction value to control the longitudinal acceleration of a vehicle;
a driver acceleration intent quantification unit that calculates a longitudinal jerk from the longitudinal acceleration according to a brake operation of a driver, and quantifies a driver's acceleration intent based on the longitudinal jerk;
a control instruction value correction determination unit that determines whether a correction to the control instruction value is required in response to the quantified driver's acceleration intent; and
a control instruction value correction unit that corrects the control instruction value in response to the correction determination result of the control instruction value correction determination unit, wherein
when the sign of the quantified driver's acceleration intent is the opposite of that of the longitudinal jerk according to the control instruction value calculated by the control instruction value calculation unit, the control instruction value correction determination unit makes a determination of reducing the control instruction value.

12. A vehicle travel control device comprising:
a control instruction value calculation unit that calculates a control instruction value to control the longitudinal acceleration of a vehicle;
a driver acceleration intent quantification unit that calculates a longitudinal jerk from the longitudinal acceleration according to a brake operation of a driver, and quantifies a driver's acceleration intent based on the longitudinal jerk;
a control instruction value correction determination unit that determines whether a correction to the control instruction value is required in response to the quantified driver's acceleration intent; and
a control instruction value correction unit that corrects the control instruction value in response to the correction determination result of the control instruction value correction determination unit, wherein
when the sign of the quantified driver's acceleration intent is the opposite of that of the longitudinal jerk according to the control instruction value calculated by the control instruction value calculation unit, the control instruction value correction determination unit makes a determination of preventing the application of the control instruction value.

13. A vehicle travel control device comprising:
a control instruction value calculation unit that calculates a control instruction value to control the longitudinal acceleration of a vehicle;
a driver acceleration intent quantification unit that calculates a longitudinal jerk from the longitudinal acceleration according to a brake operation of a driver, and quantifies a driver's acceleration intent based on the longitudinal jerk;
a control instruction value correction determination unit that determines whether a correction to the control instruction value is required in response to the quantified driver's acceleration intent; and
a control instruction value correction unit that corrects the control instruction value in response to the correction determination result of the control instruction value correction determination unit, wherein
the control instruction value correction determination unit optionally switches a mode between a mode of determining whether a correction is required and a mode of not determining whether a correction is required.

* * * * *